(12) United States Patent
Chao (10) Patent No.: US 6,712,375 B2
(45) Date of Patent: Mar. 30, 2004

(54) STRETCHABLE BICYCLE

(76) Inventor: Hung-Chang Chao, 6F, No. 21, Alley 29, Lane 372, Section 5, Chung-Shiao E. Road, Taipei (TW)

( * ) Notice: Subject to any disclaimer, the term of this patent is extended or adjusted under 35 U.S.C. 154(b) by 0 days.

(21) Appl. No.: 10/346,128

(22) Filed: Jan. 17, 2003

(65) Prior Publication Data

US 2003/0141696 A1 Jul. 31, 2003

(51) Int. Cl.[7] ............................................. B62K 15/00
(52) U.S. Cl. .................... 280/287; 280/278; 280/302
(58) Field of Search ................................ 280/287, 278, 280/281.1, 293, 295, 302, 261

(56) References Cited

U.S. PATENT DOCUMENTS

| 640,680 | A | * | 1/1900 | Merrow | 280/260 |
|---|---|---|---|---|---|
| 1,394,866 | A | * | 10/1921 | Schoenknecht | 280/287 |
| 2,993,709 | A | * | 7/1961 | Wick | 280/287 |
| 3,513,926 | A | * | 5/1970 | Paget, Jr. | 180/208 |
| 4,973,074 | A | * | 11/1990 | Robinson | 280/658 |
| 5,607,171 | A | * | 3/1997 | Labranche | 280/288.1 |
| 5,887,882 | A | * | 3/1999 | Atchison | 280/288.1 |
| 6,273,442 | B1 | * | 8/2001 | Fallon et al. | 280/287 |
| 6,364,335 | B1 | * | 4/2002 | Mombelli | 280/287 |
| 2003/0151225 | A1 | * | 8/2003 | Lopez | 280/282 |

FOREIGN PATENT DOCUMENTS

| JP | 2-249783 | * | 10/1990 | ........... B62K/15/00 |
|---|---|---|---|---|
| JP | 6-32272 | * | 2/1994 | ........... B62K/15/00 |

* cited by examiner

*Primary Examiner*—Avraham Lerner
(74) *Attorney, Agent, or Firm*—Bacon & Thomas, PLLC (57) ABSTRACT

A stretchable bicycle comprises a separate but connectable crossbar consisting of a sliding bar extended rearward from a head tube of front frame and a cross tube fixed to a support tube of rear frame, the cross tube being adapted to telescopically receive and permit the sliding bar to project from its rear end. Also, two quick-releases are provided for fastening the sliding bar at both ends of the cross tube respectively. Hence, a distance between two wheels can be adjusted by sliding a desired portion of the sliding bar inside the cross tube.

9 Claims, 11 Drawing Sheets

STRETCHABLE BICYCLE

BACKGROUND OF THE INVENTION

1. Field of the Invention

The present invention relates to a bicycles and more particularly to a stretchable bicycle with improved characteristics.

2. Description of the Prior Art

Bicycle as a transportation means is well known. Recently, bicycle is also used as a recreation means. Hence, the structure of bicycle has become more complex. Further, a variety of bicycle types are available in which a more popular one of them is a type of foldable bicycle. Furthermore, a latest type improved from the foldable bicycle is the stretchable bicycle one. Stretchable bicycle as defined herein means a rider can adjust a length of the bicycle (i.e., distance between two wheels) by operating a stretch mechanism of the bicycle so as to fit different individuals with various heights. As a result, any rider can enjoy a degree of comfort while riding the stretchable bicycle.

Figure 12:
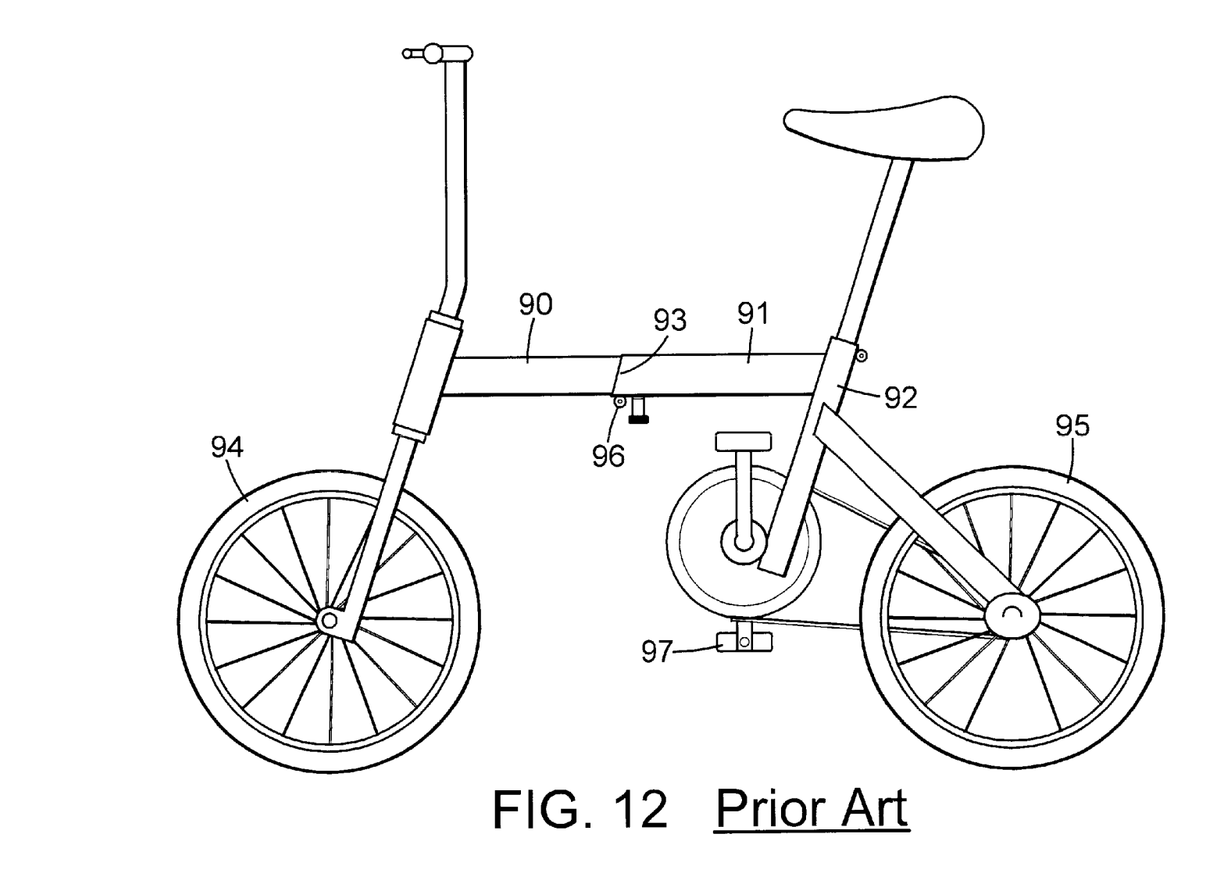
FIG. 12 is a side view of a conventional stretchable bicycle.

A conventional stretchable bicycle is illustrated in FIG. 12 in which a crossbar of a typical bicycle having a fixed length is divided into two parts each being separately manufactured but connectable as detailed later. As shown, a front crossbar 90 can be telescopically received in a rear crossbar 91 for adjusting a length of the bicycle. A rear end of the rear crossbar 91 is fixed to a seat tube 92 by welding and a front end 93 thereof is open for permitting a portion of the front crossbar 90 to receive in the rear crossbar 91. However, the front crossbar 90 cannot project from the rear end of the rear crossbar 91 since as stated above, the rear end of the rear crossbar 91 is closed at the seat tube 92. Thus, a shortening of a length of the front crossbar 90 (i.e., the crossbar's length) is limited. In other words, a shortening of distance between two wheels 94 and 95 is still limited. This has the drawbacks of adversely affecting storage and transportation due to large occupied space. Moreover, a fastening of the front and rear crossbars 90, 91 is effected by a single clamp device 96 therebetween. Hence, a reliable fastening of the crossbar is not possible. It is understood that a significant force is concentrated on the clamp device 96 when a rider rotates pedals 97 as the distance between the wheels 94 and 95 has been adjusted to a maximum. Hence, the front and rear crossbars 90, 91 as well as the bicycle itself are subjected to an abnormal vibration. To the worse, the bicycle may be broken into two parts if the clamp device 96 is collapsed. This is very dangerous.

Thus, it is desirable to provide an improved stretchable bicycle in order to overcome the above drawbacks of the prior art.

BRIEF SUMMARY OF THE INVENTION

It is an object of the present invention to provide a stretchable bicycle which comprises a separate but connectable crossbar consisting of a sliding bar extended rearward from a front frame and a cross tube fixed to a rear frame, the cross tube being adapted to telescopically receives and permits the sliding bar to project from its rear end. A distance between two wheels, being maximum, minimum, or any length between the maximum and the minimum, can be adjusted by sliding a portion of the sliding bar inside the cross tube so as to fit different individuals with various heights.

It is also an object of the present invention to provide a stretchable bicycle that can be moved easily and is suited to transport and store in, for example, trunk of an automobile after shortening to a minimum length.

It is another object of the present invention to provide a stretchable bicycle which comprises two quick-releases and an anti-twist mechanism for fastening the sliding bar at both ends of the cross tube respectively for maintaining the structural strength of the bicycle.

It is still another object of the present invention to provide a stretchable bicycle wherein for further reducing a storage or parking space, a rider can clockwise turn the bicycle 90 degrees to stand on a supporting surface so as to form a triangle by two bent portions of a kickstand and the rear end of the sliding bar.

It is a further object of the present invention to provide a stretchable bicycle wherein the sliding bar comprises a through channel for receiving umbrella, air pump, or miscellaneous items.

To achieve the above and other objects, the present invention provides a stretchable bicycle which comprises a separate but connectable crossbar consisting of a sliding bar extended rearward from a head tube of front frame and a cross tube fixed to a support tube of rear frame, the cross tube being adapted to telescopically receive and permit the sliding bar to project from its rear end. Also, two quick-releases and an anti-twist mechanism are provided for fastening the sliding bar at both ends of the cross tube respectively. Hence, a distance between two wheels, being maximum, minimum, or any length between the maximum and the minimum, can be adjusted by sliding a desired portion of the sliding bar inside the cross tube.

BRIEF DESCRIPTION OF THE SEVERAL VIEWS OF THE DRAWING

The drawings disclose two illustrative embodiments of the present invention which serves to exemplify the various advantages and objects hereof, and are as follow.

DETAILED DESCRIPTION OF THE INVENTION

Referring to FIGS. 1 to 4, there is shown a stretchable bicycle constructed in accordance with a first preferred embodiment of the invention. The bicycle consists of a front frame 10 and a rear frame 20. The front frame 10 comprises a head tube 12, a front fork 14 extended downward from the head tube 12, a top of the head tube 12 is coupled to a bottom of a stem 16, a handlebar 13 having its center coupled to a top of the stem 16, a front wheel 15 rotatably supported at bottom ends of the front fork 14 by a bolt and nut combination, and a bearing (not shown) rotatably interconnected the front fork 14 and the head tube 12 so that a rider can manipulate the handlebar 13 to pivot in a predetermined angle about a rear section of the bicycle. The front frame 10 further comprises a hinge 17 at the stem 16 near the head tube 12. The hinge 17 can be unfastened to allow the stem 16 to bend in a position shown in FIG. 8, FIG. 10. The front frame 10 further comprises a sliding bar 11 extended rearward from the head tube 12. The sliding bar 11 has a cross-section of circle in the embodiment, while it is appreciated by those skilled in the art that the sliding bar 11 may have a cross-section other than circle without departing from the scope and spirit of the invention.

The rear frame 20 comprises a bottom bracket 35 with a pair of cranks, a pair of pedals 27 and a drive mechanism 21 coupled thereto, a chain stay 29 welded at and extended rearward from the bottom bracket 35, a support tube 26 and an offset seat tube 24 parallel with the support tube 26 both welded at and extended upward from the bottom bracket 35 for forming a seat tube assembly (not numbered), a seat stay 28 welded at and extended rearward from the seat tube assembly, the seat stay 28 and the chain stay 29 having their rear ends coupled to a hub of a rear wheel 25, a drive chain (not numbered) of the drive mechanism 21 connected to the hub of the rear wheel 25 so that the bicycle can be propelled forward as the rider rotates the cranks and pedals 27, the cross tube 22 having open ends welded at the top of the support tube 26, the cross tube 22 being at the same plane as the front and rear wheels 15, 25, the cross tube 22 being adapted to telescopically receive the sliding bar 11 and permit the sliding bar 11 to project from its rear end, and a down tube 32 having both ends welded at the cross tube 22 and the support tube 26 so as to form a triangle among them. Also, the chain stay 29, the seat stay 28, and the seat tube assembly form a triangle. Hence, the structural strength of the bicycle can be enhanced.

Figure 2:
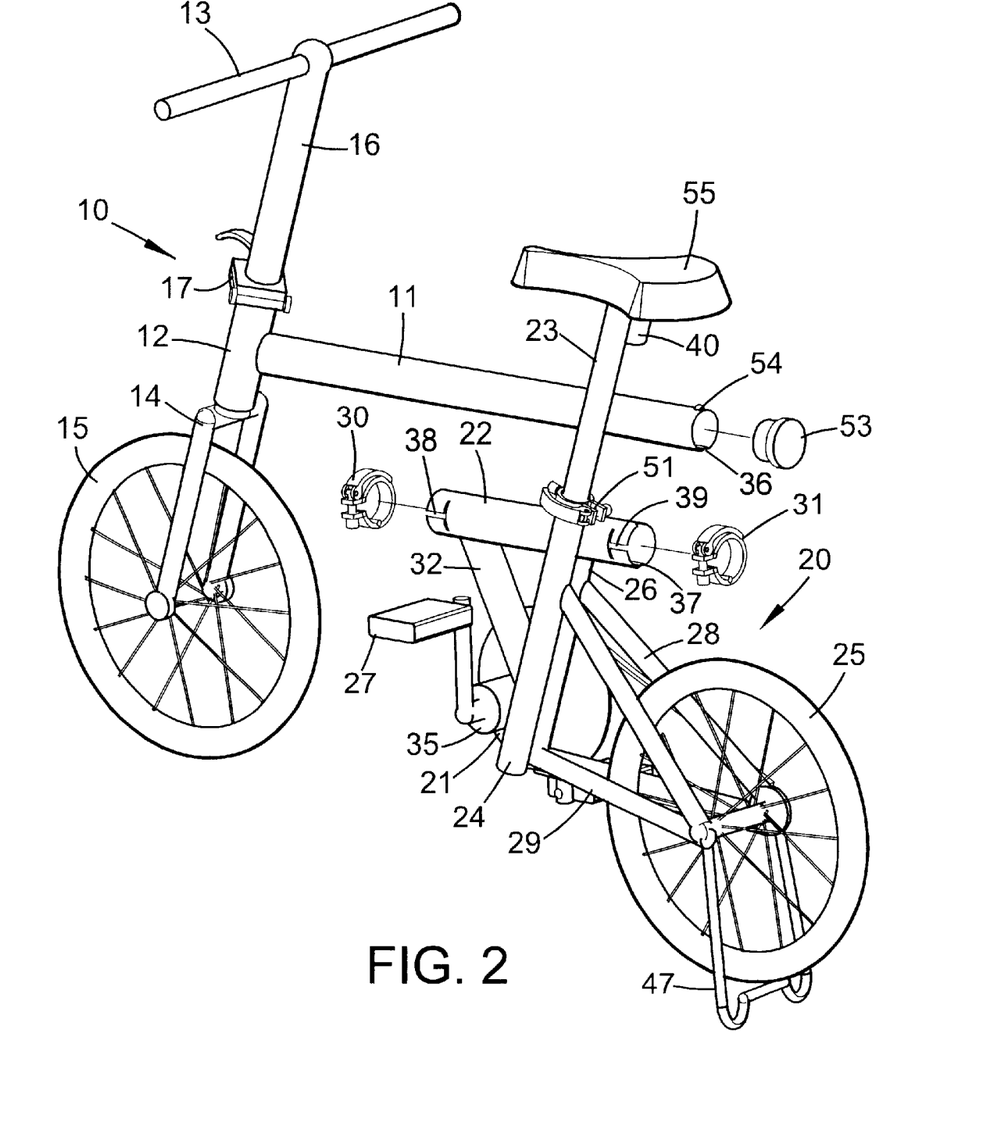
FIG. 2 is an exploded perspective view of FIG. 1.
Figure 3:
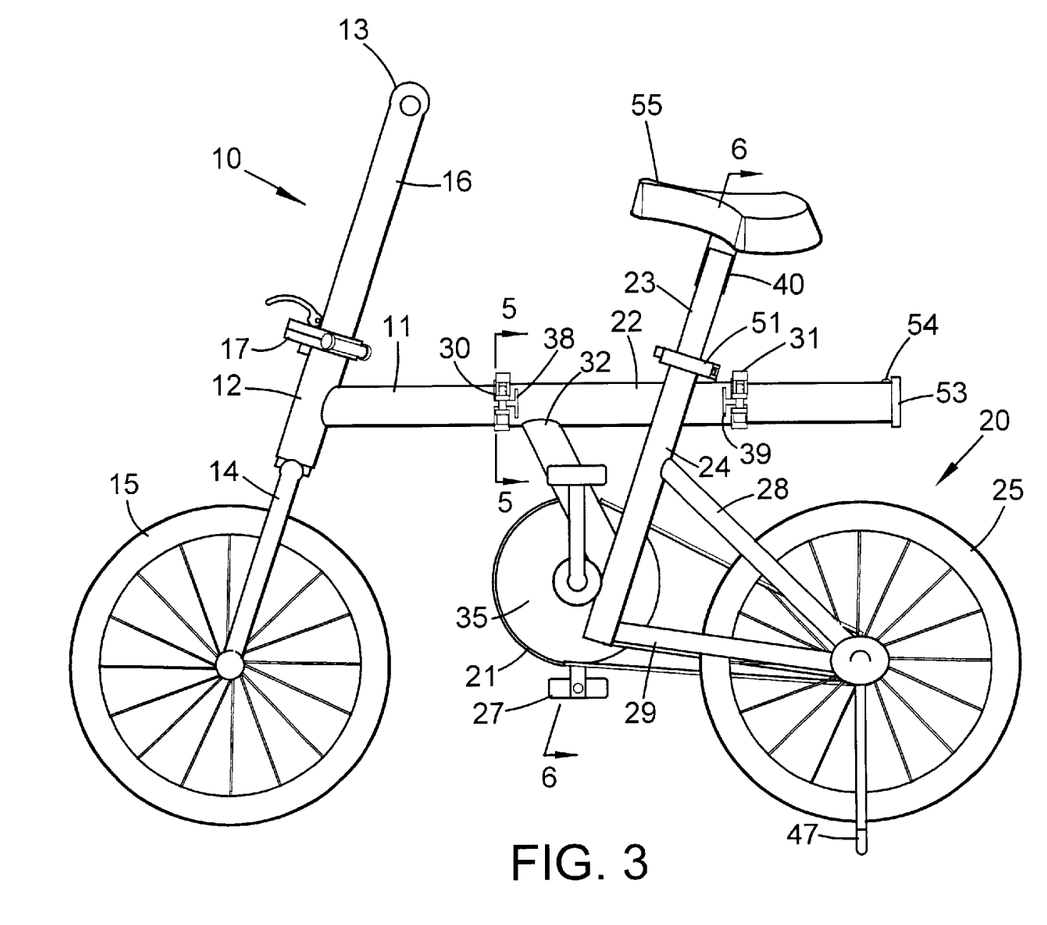
FIG. 3 is a side view of FIG. 1.
Figure 4:
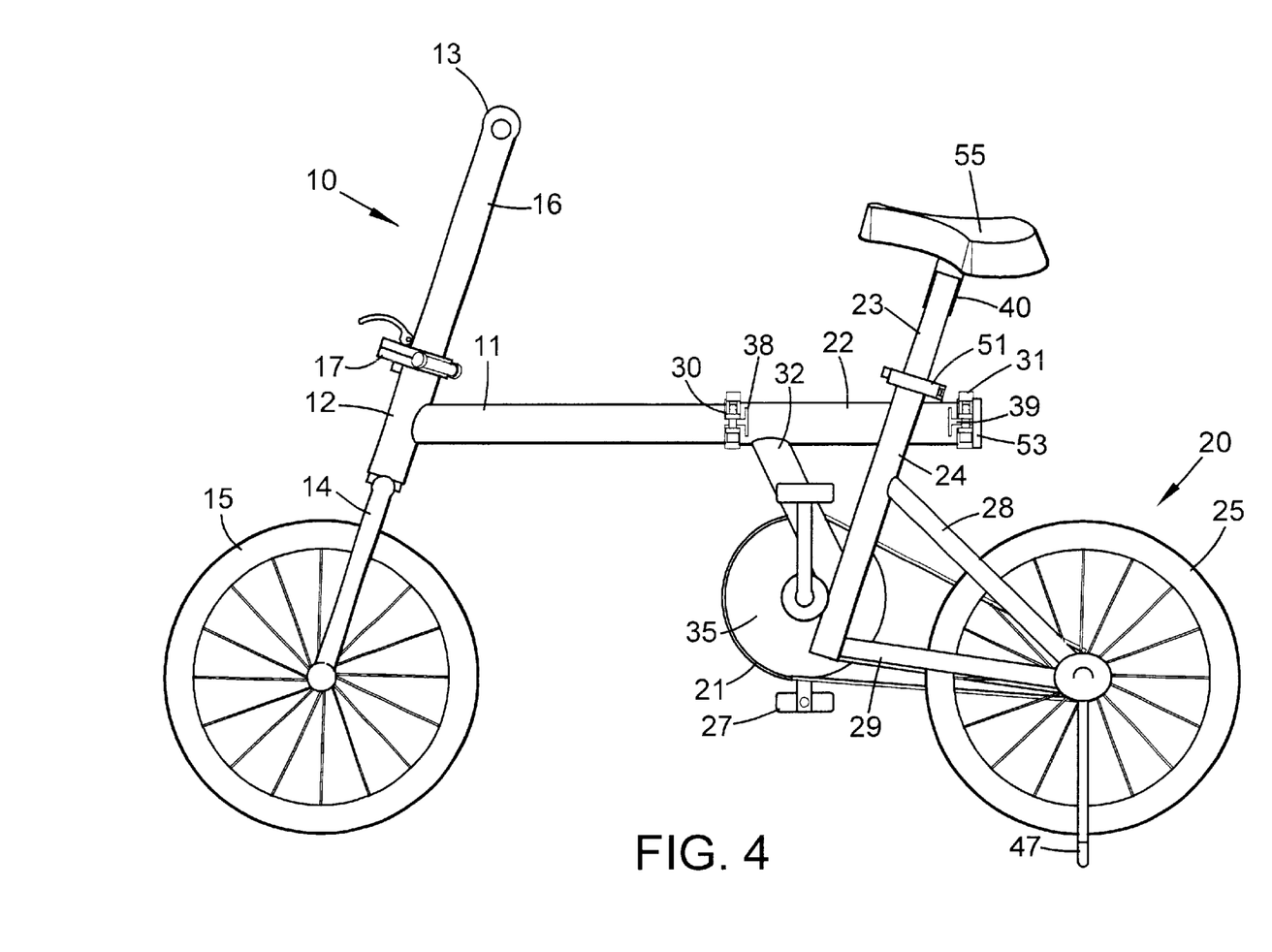
FIG. 4 is similar to FIG. 3 with the bicycle extended to its maximum length.
Figure 5:
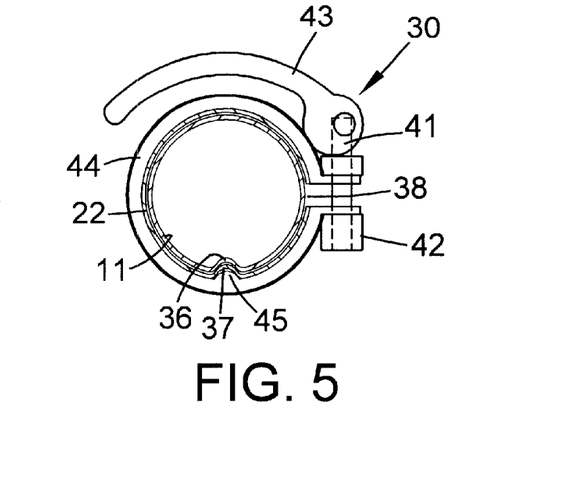
FIG. 5 is a cross-sectional view taken along line 5—5 of FIG. 3.

As shown in FIG. 5 in conjunction with FIGS. 1 to 4, the bicycle further comprises means for preventing the twist between the front frame 10 and the rear frame 20. This is made possible by creating a lengthwise groove 36 which is formed at an outer surface of the sliding bar 11 and a lengthwise ridge 37 which is formed at an inner surface of the cross tube 22. Hence, a tight fastening of the sliding bar 11 in the cross tube 22 is achieved as the groove 36 and the ridge 37 are closely engaged. Further, two T-shaped slots 38, 39 are formed at both ends of the cross tube 22 respectively for providing a flexibility of contraction thereat as the sliding bar 11 is fastened in the cross tube 22. At this time, the rider can select a desired length of the bicycle (i.e., distance between the wheels 15 and 25) by sliding the sliding bar 11 inside the cross tube 22. Next, two quick-releases 30, 31 are used to fasten the sliding bar 11 and the cross tube 22 at the T-shaped slots 38, 39 respectively wherein the vertical section of each T-shaped slot is contracted to cause the cross tube 22 to tightly cling onto the sliding bar 11. As shown in FIG. 4, the bicycle has been extended to its maximum length wherein the rear ends of the sliding bar 11 and the cross tube 22 are aligned and the distance between the wheels 15 and 25 is a maximum. Such configuration is appropriate for an adult or taller person. The quick-releases 30, 31 are commercially available ones such as C-shaped clips. A typical quick-release comprises a bolt 41, a nut 42, a level 43 pivotally disposed at one end of the bolt 41, and a C-shaped ring 44 put on the cross tube 22. The rider can pivot the level 43 to cause its cam surface to exert a force on the ring 44 to cling the ring 44 onto the cross tube 22. To the contrary, a quick reverse operation can unfasten the quick-releases 30 and 31 and the cross tube 22. Further, a projection 45 is formed on the ring 44 for being adapted to the ridge 37.

Figure 6:
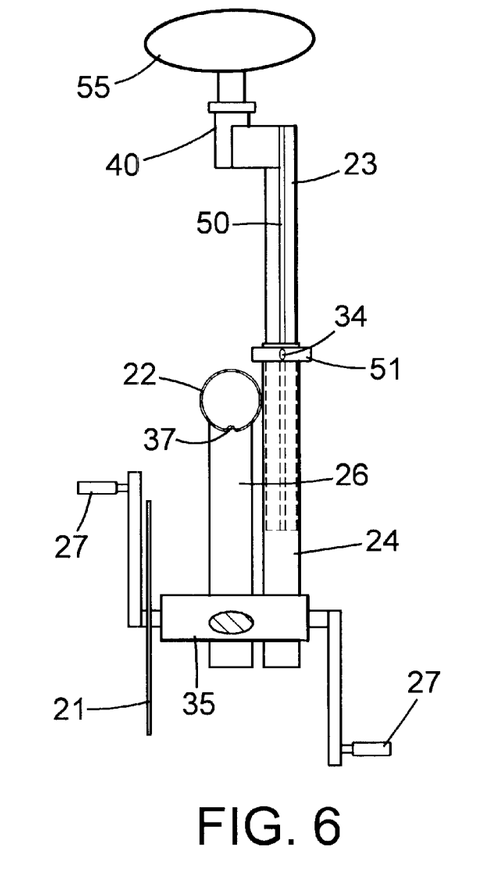
FIG. 6 is a cross-sectional view taken along line 6—6 of FIG. 3.

As shown in FIG. 6, the offset seat tube 24 is laterally adjacent to the cross tube 22 and is adapted to receive an adjustable portion of the sliding seat tube 23. As such, not only the sliding bar 11 can go into the cross tube 22, which has an opening at both the front and rear ends, without being blocked by the offset seat tube 24 and the support tube 26 but also the adjustable length created by the cross tube 22 and the sliding bar 11 is extended. To align the center of gravity of the bicycle with the wheels 15 and 25 while riding, the saddle 55 is disposed at one side of the sliding seat tube 23 and a seat post 40 welded at a member laterally extended from the top of the sliding seat tube 23. Also, the seat post 40 and the saddle 55 is located right above the cross tube 22.

A third quick-release 51 is used to fasten the sliding seat tube 23 and the offset seat tube 24 when a portion of the sliding seat tube 23 is slid inside the offset seat tube 24. This mechanism for fastening the sliding seat tube 23 and the offset seat tube 24 is similar to the one used for fastening the sliding bar 11 and the cross tube 22. In this fastening mechanism a lengthwise trough 50 is formed at an outer surface of the sliding seat tube 23, a protuberance 34 is formed at an inner surface of the offset seat tube 24, the protuberance 34 being tightly engaged with the trough 50. Once adjusted, the third quick-release 51 at the top of the offset seat tube 24 can be used to fasten the sliding seat tube 23 and the offset seat tube 24. In view of the above, after adjusting the length and height of the bicycle, components of the bicycle are secured by the two fastening mechanisms. Hence, a structural strength is still maintained without worrying about collapsing at the joint of the front and the rear frames 10, 20.

Figure 7:
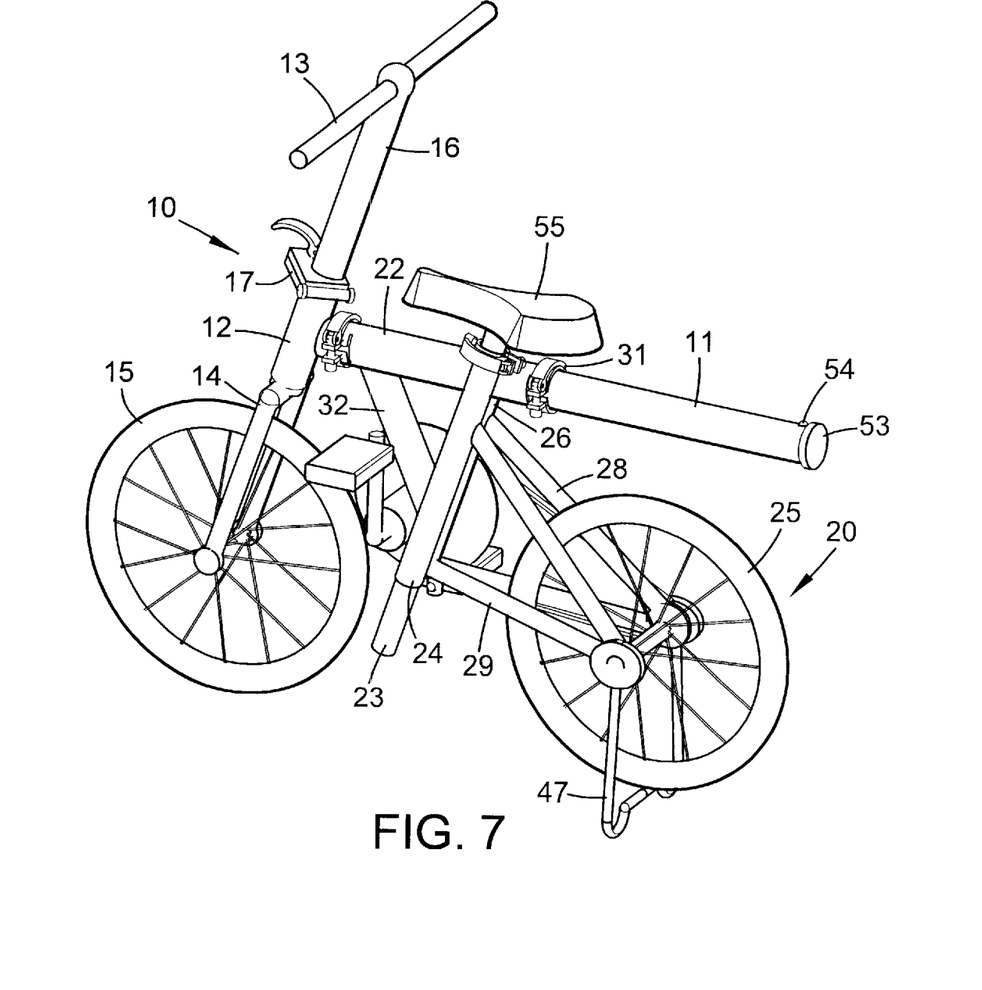
FIG. 7 is a perspective view of the bicycle shortened to its minimum length.
Figure 8:
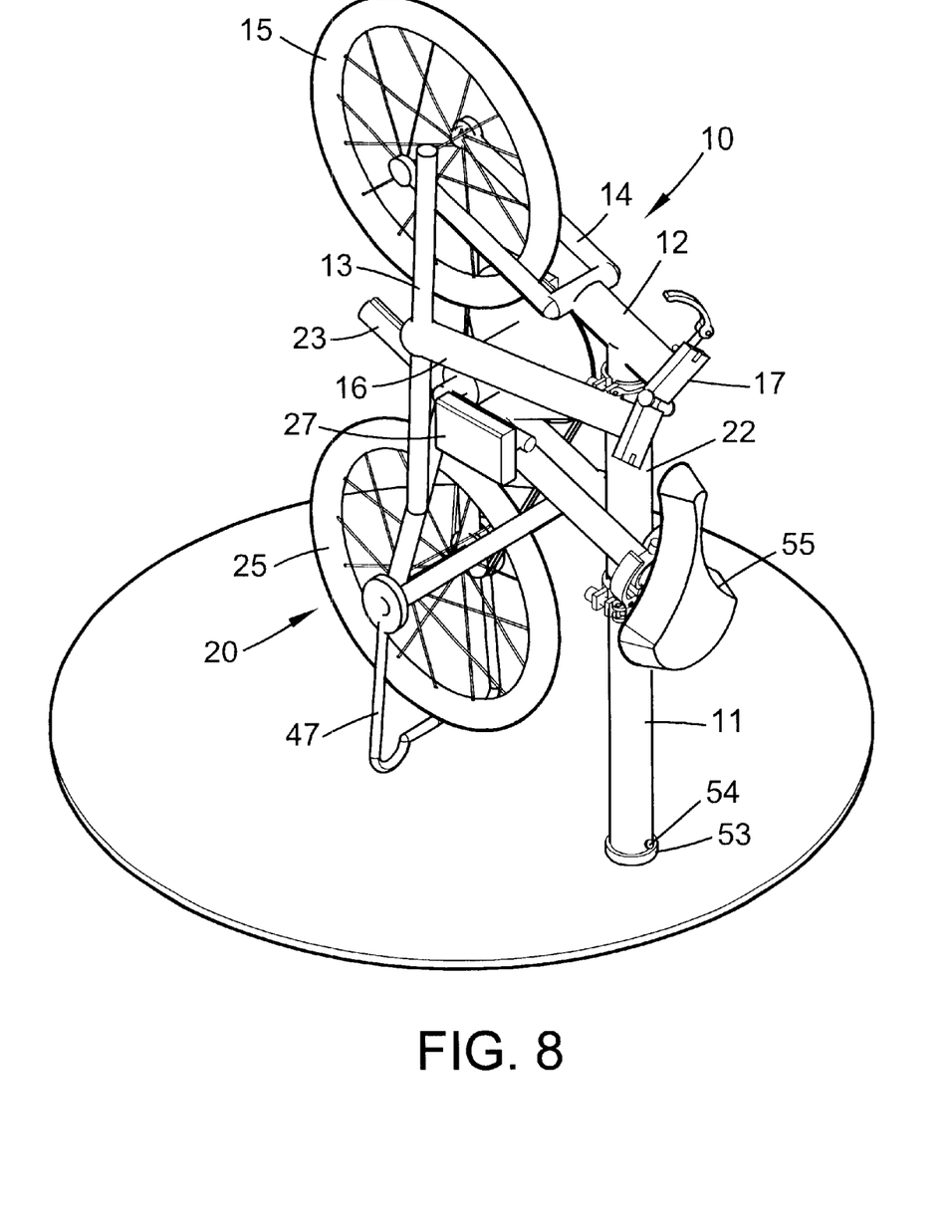
FIG. 8 is another perspective view of the bicycle shown in FIG. 7 wherein the bicycle is clockwise turned 90 degrees to stand on a supporting surface.

As shown in FIGS. 7 and 8, for storage or parking, it is possible of projecting the sliding bar 11 from the rear end of the cross tube 22 to a maximum i.e., the distance between the wheels 15 and 25 is shortened to a minimum. A typical U-shaped kickstand 47 is attached to the rear wheel 25. For holding the stationary bicycle upright, the rider can kick the kickstand 47 to pivot about the rear wheel 25 to a vertical position. Alternatively, for further reducing a storage or parking space the rider can clockwise turn the bicycle 90 degrees to stand on a supporting surface wherein a triangle is formed by two bent portions of the kickstand 47 and the rear end of the sliding bar 11.

Referring to FIGS. 1 to 3 again, the sliding bar 11 may be formed as a tube for receiving umbrella, air pump, or miscellaneous items. Further, a cap 53 is formed at the rear end of the sliding bar 11 for preventing the received article (s) from being dropped out of the sliding bar 11. Moreover, a battery compartment containing one or more rechargeable cells may be formed in the sliding bar 11 when the bicycle is designed as an electric bicycle.

Figure 1:
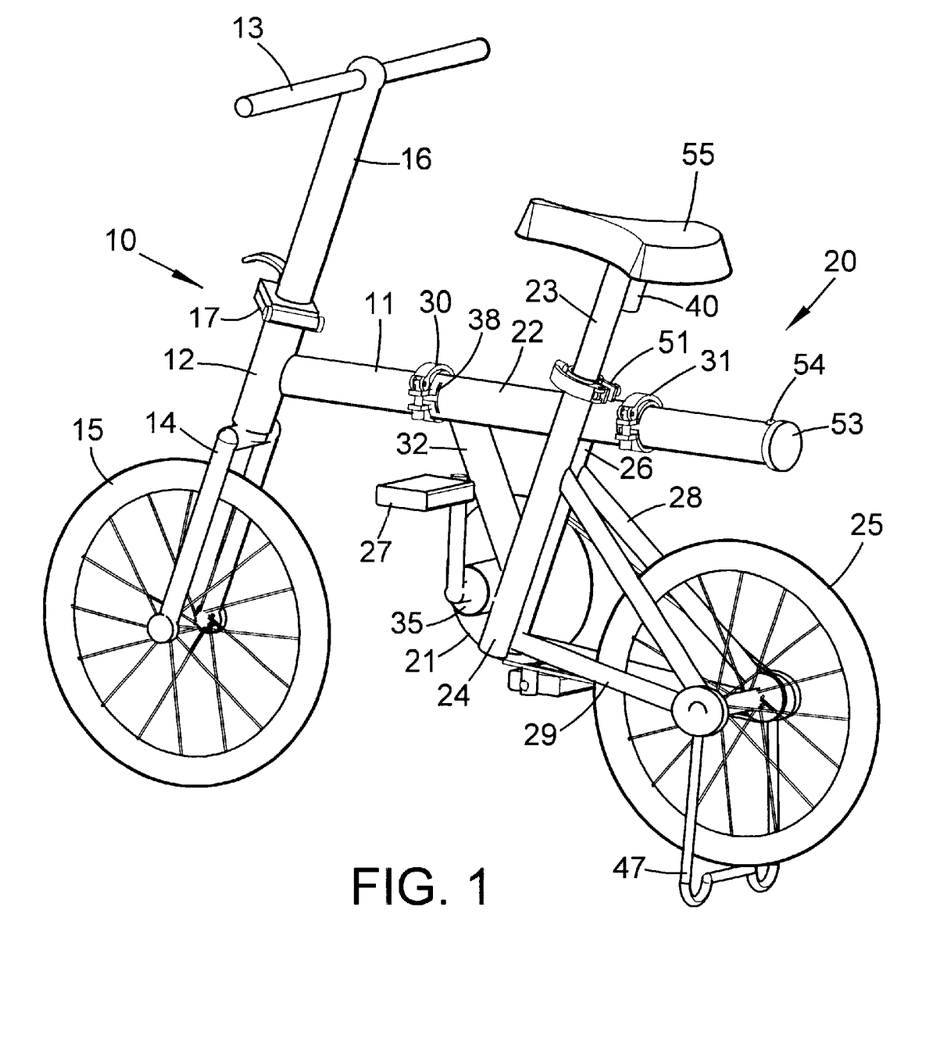
FIG. 1 is a perspective view of a first preferred embodiment of a stretchable bicycle according to the invention.

A stop 54 is formed at the rear end of the sliding bar 11. The stop 54 can prevent the rear end of the sliding bar 11 from further sliding inside the cross tube 22 or even disengaging from the cross tube 22 when the maximum length of the rider has been reached because the rear end of the cross tube 22 is stopped by the stop 54.

Figure 9:
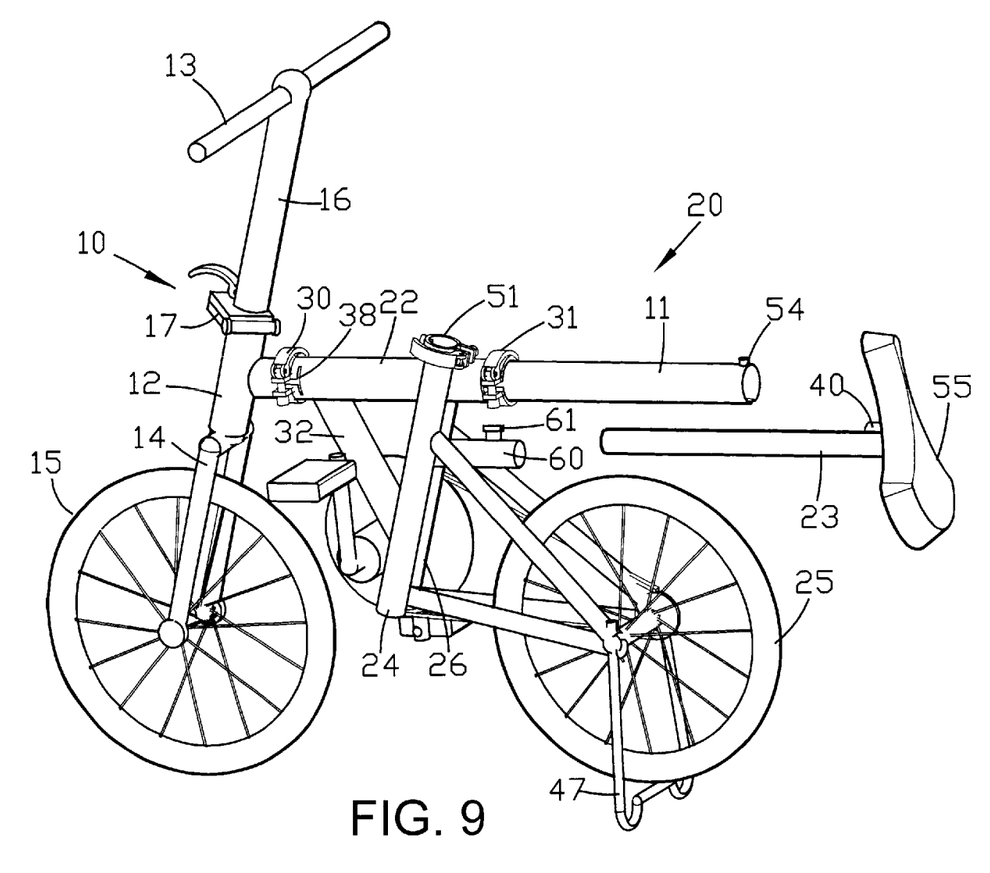
FIG. 9 is a perspective view of a second preferred embodiment of stretchable bicycle according to the invention with the sliding seat tube and the saddle separated from the bicycle.
Figure 10:
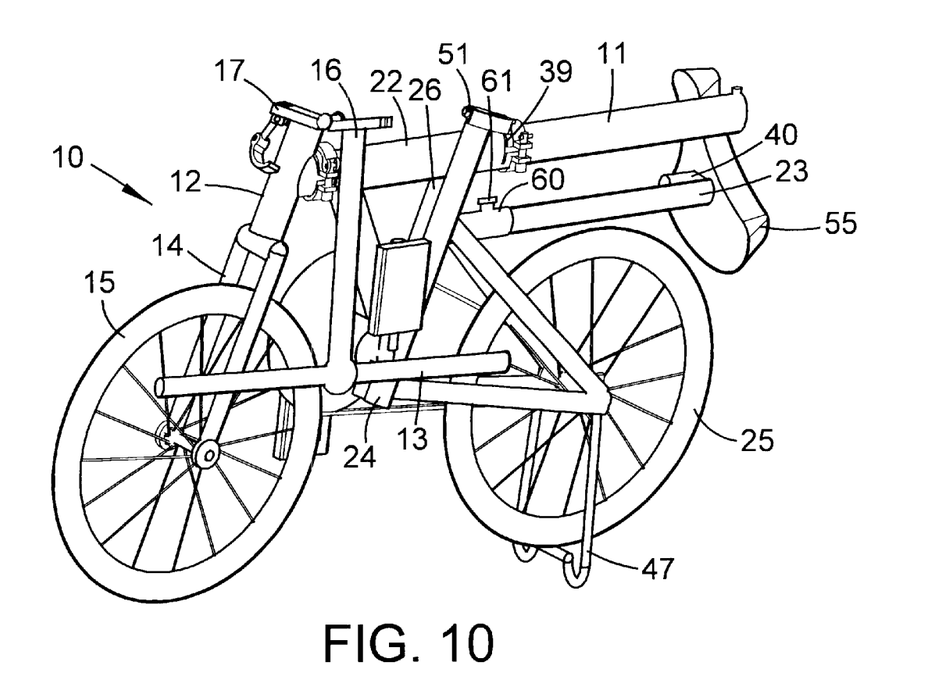
FIG. 10 is a perspective view of the bicycle of FIG. 9 shortened to its minimum length.

Referring to FIGS. 9 and 10, there is shown a second preferred embodiment of stretchable bicycle according to the invention. The differences between the first and the second preferred embodiments, i.e., the characteristics of the second preferred embodiment are detailed below. A saddle containing tube 60 is formed below the cross tube 22 and is welded between the offset seat tube 24 and the support tube 26. The rider can remove the sliding seat tube 23 prior to inserting into the saddle containing tube 60 for reducing a storage space. Moreover, the rider can fold down the stem 16 by unfastening the hinge 17. Also, the rider can slide the sliding bar 11 into the cross tube 22 and project from the rear end of the cross tube 22 to obtain the minimum distance between the wheels 15 and 25. This is shown in FIG. 10. A bolt 61 is formed on the saddle containing tube 60. The bolt 61 can be driven to fasten the sliding seat tube 23 inside the saddle containing tube 60. In addition, the triangular saddle 55 can cause no interference with the sliding bar 11 at the position shown in FIG. 10.

Figure 11:
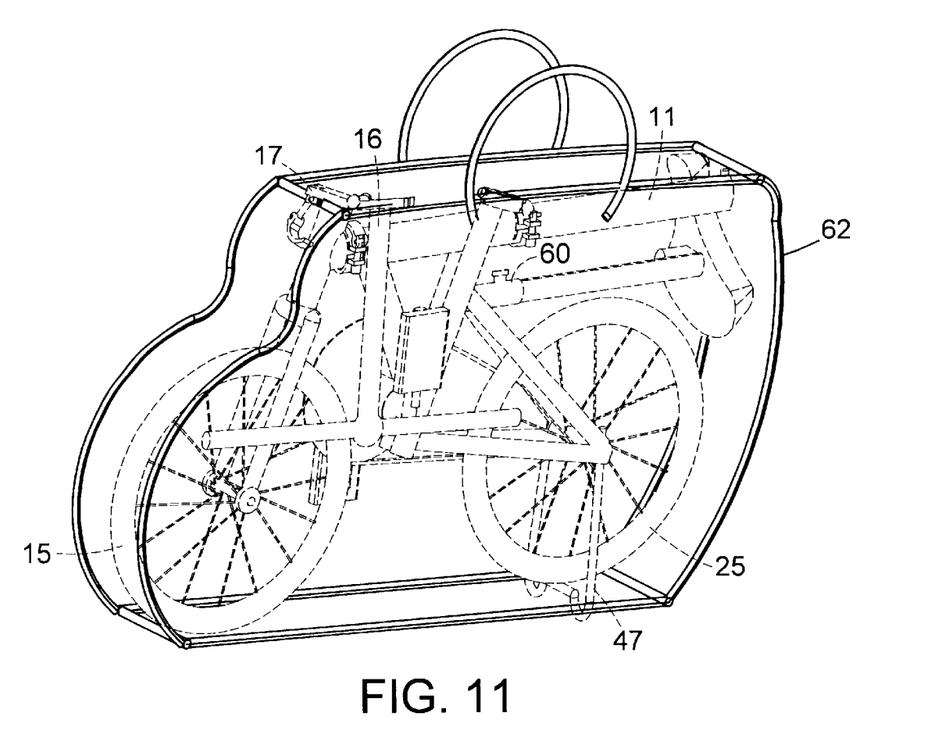
FIG. 11 is a view similar to FIG. 10 where the fully shortened bicycle is stored in a large bag.

Referring to FIG. 11, the folded and shorten bicycle is stored in a bag 62 prior to transportation by lifting handles of the bag 62.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What I claim as my invention is:

1. A stretchable bicycle comprising:
   a front frame comprising a head tube, a sliding bar extended rearward from the head tube, a stem extended downward from a handlebar to couple to the top of the head tube, a front fork extended downward from the stem, and a front wheel rotatably supported at bottom ends of the front fork; and
   a rear frame comprising a chain stay, a seat stay, a rear wheel, a bottom bracket with a pair of pedals and a drive mechanism coupled thereto, a support tube and an offset seat tube parallel with the support tube both extended upward from the bottom bracket, a cross tube opening at both its front and rear ends formed at a top of the support tube, being adapted to telescopically receive the sliding bar of the front frame, a sliding seat tube extended from and slidably received in the offset seat tube which is laterally adjacent to the cross tube, a saddle on a top of the sliding seat tube, a seat post formed at a lateral extension from the top of the sliding seat tube for supporting the saddle right above the cross tube, and two quick-releases for fastening the sliding bar at both ends of the cross tube respectively.

2. The stretchable bicycle of claim 1, further comprising means for preventing the twist between the front frame and the rear frame.

3. The stretchable bicycle of claim 2, wherein said means for preventing comprises a lengthwise groove formed at an outer surface of the sliding bar and a lengthwise ridge formed at an inner surface of the cross tube so that the sliding bar can be tightly fasten in the cross tube as the groove and the ridge are tightly engaged.

4. The stretchable bicycle of claim 1, further comprising two T-shaped slots formed at both ends of the cross tube respectively for providing a flexibility of contraction thereat as the sliding bar is fastened in the cross tube.

5. The stretchable bicycle of claim 1, further comprising a third quick-release for fastening the sliding seat tube and the offset seat tube when a selected portion of the sliding seat tube is slid inside the offset seat tube, a lengthwise trough formed at an outer surface of the sliding seat tube, and a protuberance formed at an inner surface of the offset seat tube, the protuberance being closely engaged with the lengthwise trough.

6. The stretchable bicycle of claim 1, further comprising a channel formed within and along the sliding bar served a receiving space and a cap formed at the rear end of the sliding bar for closing the rear end of the sliding bar.

7. The stretchable bicycle of claim 1, further comprising a U-shaped kickstand attached to the rear wheel wherein the bicycle is operative to clockwise turn about 90 degrees to stand on a supporting surface so as to form a triangle by two bent portions of the kickstand and the rear end of the sliding bar.

8. The stretchable bicycle of claim 1, further comprising a stop formed at the rear end of the sliding bar for preventing the rear end of the sliding bar from sliding inside the cross tube or disengaging from the cross tube when the rear ends of the sliding bar and the cross tube are aligned.

9. The stretchable bicycle of claim 1, further comprising a saddle containing tube formed below the cross tube and between the offset seat tube and the support tube for receiving the removed sliding seat tube.

* * * * *